(12) United States Patent
Prestenback et al.

(10) Patent No.: US 8,521,004 B2
(45) Date of Patent: Aug. 27, 2013

(54) METHODS AND APPARATUSES FOR MANAGING ASSETS STORED IN LOCAL MEMORY OF AN OPTICAL DISC PLAYER DEVICE

(75) Inventors: Kyle Prestenback, Burbank, CA (US); Evan Tahler, Burbank, CA (US); Evan Acosta, La Crescenta, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1178 days.

(21) Appl. No.: 12/211,710

(22) Filed: Sep. 16, 2008

(65) Prior Publication Data
US 2009/0307723 A1 Dec. 10, 2009

Related U.S. Application Data

(60) Provisional application No. 61/059,537, filed on Jun. 6, 2008.

(51) Int. Cl.
*H04N 5/445* (2011.01)

(52) U.S. Cl.
USPC .................................... 386/248; 725/39

(58) Field of Classification Search
USPC ............................ 328/248; 725/39
See application file for complete search history.

(56) References Cited

U.S. PATENT DOCUMENTS

| | | | |
|---|---|---|---|
| 6,567,980 B1 | 5/2003 | Jain et al. | |
| 6,845,381 B2 | 1/2005 | Kusumoto | |
| 7,366,744 B2 | 4/2008 | Tomita | |
| 8,239,351 B2 * | 8/2012 | Hornqvist | 707/687 |
| 2003/0223319 A1 * | 12/2003 | Kim | 369/30.07 |
| 2005/0149213 A1 * | 7/2005 | Guzak et al. | 700/94 |
| 2006/0280048 A1 * | 12/2006 | Jung et al. | 369/30.01 |
| 2007/0239795 A1 * | 10/2007 | Oyanagi et al. | 707/200 |
| 2007/0274180 A1 * | 11/2007 | Kato et al. | 369/47.16 |
| 2007/0288426 A1 | 12/2007 | Schachter | |
| 2007/0294324 A1 | 12/2007 | Gates et al. | |
| 2008/0025182 A1 * | 1/2008 | Seo et al. | 369/85 |
| 2008/0091749 A1 * | 4/2008 | Kitamaru | 707/205 |
| 2008/0162931 A1 * | 7/2008 | Lord et al. | 713/165 |
| 2009/0013005 A1 * | 1/2009 | Hung | 707/200 |
| 2012/0173642 A1 * | 7/2012 | Rosenberger | 709/206 |

FOREIGN PATENT DOCUMENTS

WO WO2008/033552 3/2008

OTHER PUBLICATIONS

Cosmas et al., "Storage Manager System for DVB Terminals", http://www.cms.livjm.ac.uk/pgnet2001/papers/KKRISHNAPILLAI1. DOC, 5 pages.
"Virage introduces media management system-breakthrough video cataloging and media asset management solutions" 2008, 3 pages.

* cited by examiner

*Primary Examiner* — Michael S McNally
(74) *Attorney, Agent, or Firm* — Samuel K. Simpson; Patent Ingenuity, P.C.

(57) ABSTRACT

Methods and apparatuses are provided, which may be implemented for use in managing data assets stored in local memory of the optical disc player device.

54 Claims, 9 Drawing Sheets

METHODS AND APPARATUSES FOR MANAGING ASSETS STORED IN LOCAL MEMORY OF AN OPTICAL DISC PLAYER DEVICE

RELATED APPLICATIONS

This patent application claims benefit of and priority to U.S. Provisional Patent Application 61/059,537, filed Jun. 6, 2008, and titled "Methods And Apparatuses For Managing Data Assets Stored In Local Memory Of An Optical Disc Player Device", and which is incorporated in its entirety by reference herein.

BACKGROUND

1. Field

The subject matter disclosed herein relates to electronic devices such as, for example, optical disc player devices, and more particularly to methods and apparatuses for managing data assets stored in local memory of such devices.

2. Information

Electronic entertainment systems continue to advance in sophistication and popularity. Standard definition televisions are being replaced with higher definition video monitor devices and high fidelity audio monitor devices in an attempt to provide an improved entertainment experience. Likewise, standard definition video tape players and/or DVD player devices are being replaced with higher definition optical disc player devices, such as, for example, Blu-Ray disc player devices. Furthermore, content establishing devices, such as web cameras, video cameras, still image cameras, sound recording devices, etc., are also being replaced or upgraded to provide higher definition content.

Computing and communication systems and networks also continue to advance in sophistication and popularity. The Internet and related computing and communication infrastructure, for example, continues to improve and expand in content, access, speed, variety, etc. Electronic entertainment systems may be further enhanced by interfacing with such networked resources. By way of example, certain set-top boxes may be adapted to access networked resources and provide information and/or content received there from for use in an electronic entertainment system. Some set-top boxes may also be adapted to allow for information and/or content to be provided from one or more devices in an electronic entertainment system to one or more networked resources.

The sharing and distribution of content and in particular video/audio content continues to increase as more and more users upload and download such content to and from various network resource devices. Certain optical disc drives may include local storage (memory) in which various data assets may be stored in a persistent manner.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
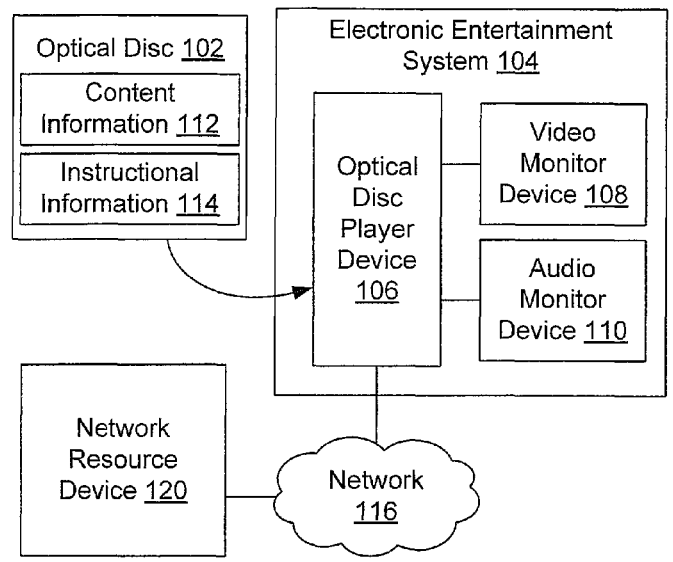
FIG. 1 is a block diagram illustrating an exemplary implementation of a computing environment that includes an electronic entertainment system with an optical disc player device adapted for managing data assets stored in local memory thereon.

FIG. 1 illustrating an exemplary implementation of a computing environment 100 that may include various networked computing devices and an electronic entertainment system. The electronic computing environment may include, for example, an optical disc and an optical disc player device, which may be adapted for use in managing data assets stored in local memory of the optical disc player device.

As shown, environment 100 may include an optical disc 102 adapted for use in an electronic entertainment system 104 having an optical disc player device 106 coupled to a video monitor device 108 and audio monitor device 110. In this example, optical disc 102 may include content information 112 and instructional information 114. Electronic entertainment system 104 may, for example, be operatively coupled to communicate with at least one computing device, such as, network resource device 120 through a network 116.

At least a portion of instructional information 114 may be implemented to adapt optical disc player device 106 to manage data assets stored in local memory of the optical disc player device.

Network resource device 120 may include one or more computing devices that may be adapted to act as a source for certain data assets that may be stored in local memory of optical disc player device 106.

Figure 2:
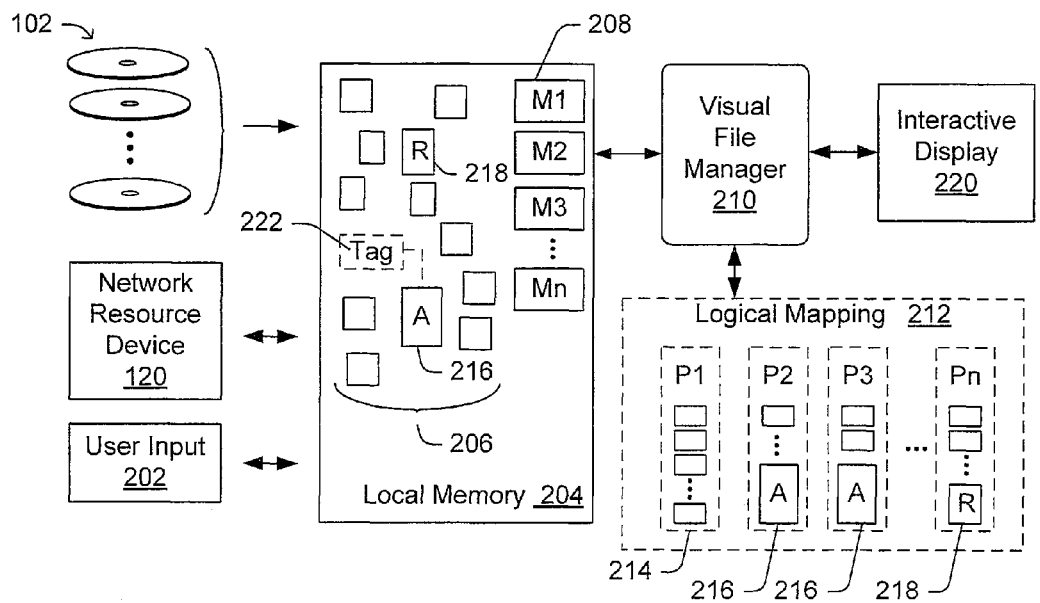
FIG. 2 is a block diagram illustrating certain features of an exemplary optical disc player device having a visual file manager adapted for managing data assets stored in local memory of the optical disc player device.

FIG. 2 is a block diagram illustrating certain features of an exemplary optical disc player device 106 having a visual file manager 210 adapted for managing data assets 206 stored in local memory 204 of optical disc player device 106.

As illustrated in FIG. 2, local memory 204 may be adapted to store various data assets 206. By way of example but not limitation, data assets 206 may, for example, be associated with various different content information and/or instructional information from one or more optical discs 102, network resource device 120, and/or user inputs 202. Over a period of time, the number and variety of such data assets may grow as they may be persisted in local memory 204. In certain implementations, the limited amount of local memory may be quickly consumed as optical discs are played and removed, content is downloaded, etc. Consequently, it may be beneficial to provide for the management of such data assets.

In an exemplary implementation, optical disc player device 106 may include a Blu-ray disc player having a persisted local memory that may be used to store various data assets. The file structure associated with Blu-ray discs and Blu-ray players may be adapted such that a virtual file structure is provided in which a current Blu-ray disc may be presented as the root directory and the local memory and data assets therein may be presented as subdirectories under the root file. Accordingly, it may not be intuitive and/or may otherwise be exceedingly difficult for a user to effectively try to manage the data assets that build up over time as left behind by previous operations. For example, it may be difficult just to locate and identify data assets, let alone determine which data assets may be removed and which data assets should persist.

Referring again to FIG. 2, a visual file manager (VFM) 210 may be provided within optical disc player device 106 that may be adapted to identify data assets 206 within local memory 204 and provide a logical mapping 212 in which data assets 206 may be logically associated with one or more "logical packages", illustrated here as logical packages P1, P2, P3, . . . , Pn. Such logical association may, for example, be implemented through VFM 210 by tagging data assets, e.g., associating a tag or other like identifier data to the various data assets 206. For example, as illustrated a tag 222 may be associated with a data asset "A" 216 to logically associate data asset "A" 216 with logical package P2. Tag 222 may, for example, include data stored in metadata of data asset "A" 216. Tag 222 may, for example, indicate that an identifier associated with data asset "A" 216 may be included by VFM 210 in a manifest file "M2" 208 that may define one or more data assets logically associated with package P2. VFM 210 may, for example, tag data assets based on metadata therein which may help to identify a disc, a program, content, a source, a title, a name, a user, and/or other like data that may be useful in packaging such data assets.

Certain discs and/or information stored thereon may be specifically provided with tagged metadata and/or the like, along with VFM 210 to quickly support, update, and/or establish one or more applicable manifests 208. In certain example implementations, other data assets may be discovered and tagged by VFM 210.

There may be some data assets 206 that may need to persist, for example, important programming or operating system files may be restricted in some manner. Here, by way of illustration, data asset "R" 218 may be restricted in some manner. For example, data asset "R" 218 may be restricted from being manipulated through VFM 210, and/or may be restricted from even being presented through a displayed identifier to the user (e.g., via an interactive display 220). In certain implementations, VFM 210 may restrict such presentation/display of some data assets based, at least in part, on one or more user settings/inputs. For example, certain data assets may be subjected to parental or other like security policies that may restrict presentation and/or manipulation.

Figure 4:
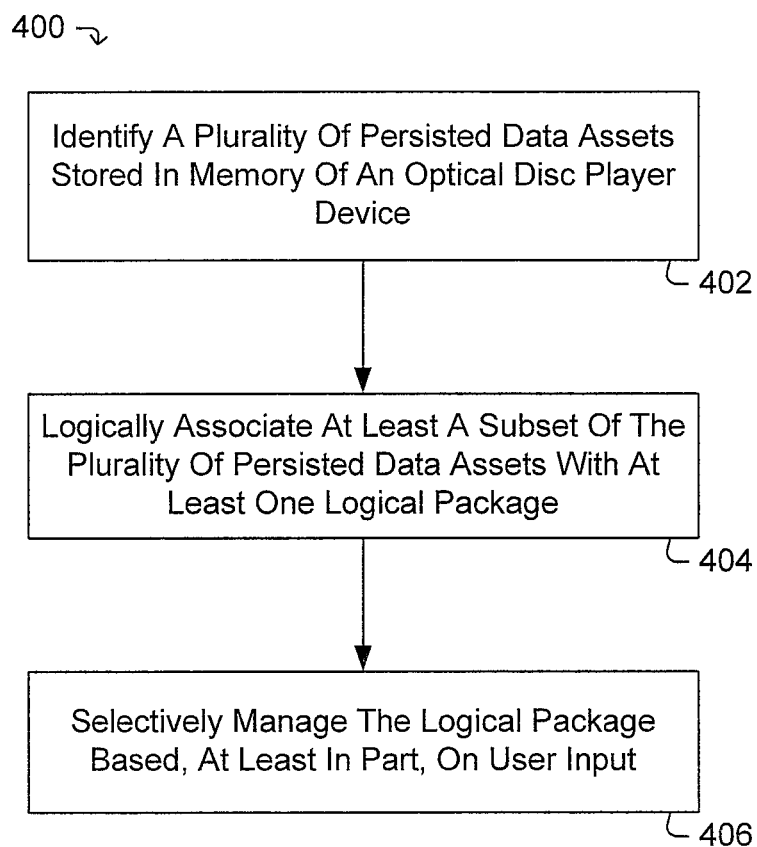
FIG. 4 is a flow diagram illustrating an exemplary implementation of a method that may be adapted for use in managing data assets stored in local memory of the optical disc player device.

Reference is now made to FIG. 4, which is a flow diagram illustrating an exemplary implementation of a method 400 that may be adapted for use in managing data assets stored in local memory of the optical disc player device. At block 402, a plurality of persisted data assets stored in memory of an optical disc player device may be identified. At block 404, at least a subset of the plurality of persisted data assets may be logically associated with at least one logical package. At block 406 the logical package may be selectively managed based, at least in part, on user input.

With exemplary method 400 in mind, returning to FIG. 2, VFM 210 may, for example, be adapted to identify a plurality of persisted data assets 206 stored in memory 204 of an optical disc player device 106, logically associate at least a subset of the plurality of persisted data assets 206 with at least one logical package, and selectively manage the logical package based, at least in part, on user input. Here, for example, the user input may be adapted to initiate manipulation of at least one of the plurality of persisted data assets.

In certain implementations, a first portion of the plurality of persisted data assets may be associated with a first non-persisted data source and at least a second portion of the plurality of persisted data assets may be associated with at least a second non-persisted data source. By way of example but not limitation, the first non-persisted data source may include a first optical disc associated with first content information and the second non-persisted data source may include a second optical disc associated with second content information. Here, the first and second content information may each be associated with at least one common content source entity, for example. In certain implementations, the first non-persisted data source may include at least one network resource device 120.

VFM 210 may be adapted to associate each of the plurality of persisted data assets in such a subset with at least one common data tag. The common data tag may be provided in a metadata portion of each of the plurality of persisted data assets, for example. VFM 210 may be adapted to identify each of the plurality of persisted data assets in the subset in at least one manifest associated with the package.

VFM 210 may be adapted to at least initiate presentation of at least one data asset identifier associated with at least one of the plurality of persisted data assets in the subset through a user interactive display 220. In certain example, implementations, VFM 210 may be adapted to not initiate presentation of at least a data asset identifier associated with at least a second one of the plurality of persisted data assets in the subset. VFM 210 may, for example, be adapted to initiate presentation of at least one status parameter associated with the memory of the optical disc player device through a user interactive display.

VFM 210 may be adapted to manipulate selected data assets by removing them and/or marking them for removal local memory 204. In certain example implementations, VFM 210 may be adapted to prevent manipulation of certain data assets.

In certain example implementations, a data asset may be logically associated with a plurality of logical packages. Moreover, a logical package may itself be logically associated with at least one other logical package.

In certain example implementations, VFM 210 may be adapted to at least initiate presentation of at least one data asset identifier associated with at least one of the plurality of persisted data assets through a user interactive display 220 based on a title, a package, and/or a source.

Figure 3:
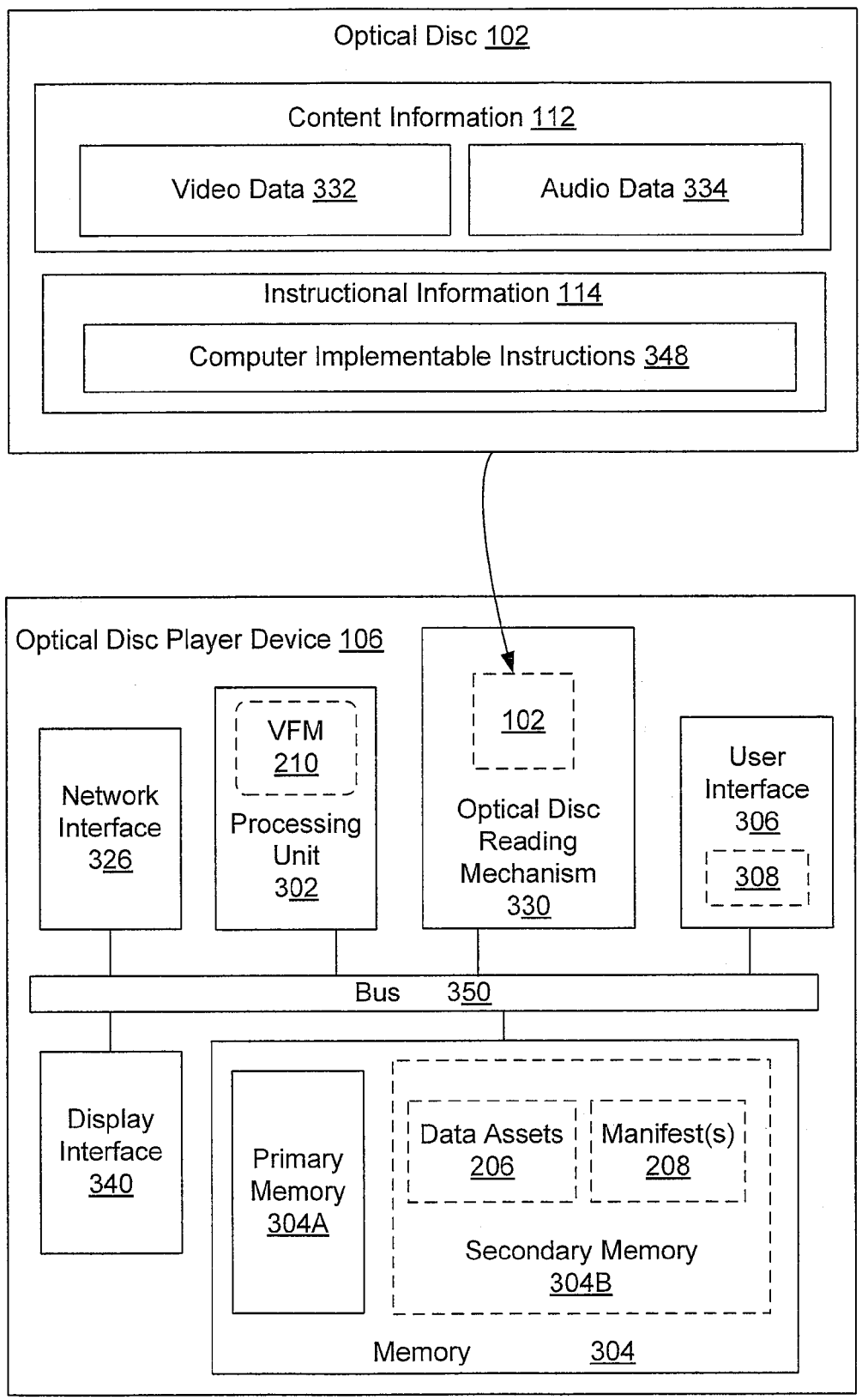
FIG. 3 is a block diagram illustrating certain features of an example implementation of an optical disc and an optical disc player device as may be implemented for use in managing data assets stored in local memory of the optical disc player device.

FIG. 3 is a block diagram illustrating certain features of an example implementation of an optical disc 102 and an optical disc player device 106 as may be implemented for use in managing data assets stored in local memory of the optical disc player device.

Optical disc player device 106 may, for example, include at least one processing unit 302, memory 304, a user interface 306, an optical disc reading mechanism 330, a network interface 326, and a display interface 340. As illustrated in FIG. 3, at least one bus 350 or the like may be adapted to operatively couple two or more of processing unit 302, memory 304, user interface 306, optical disc reading mechanism 330, network interface 326, and/or display interface 340.

As illustrated, optical disc 102 may be operatively coupled to (and accessed through) optical disc reading mechanism 330. Optical disc 102 may have stored thereon content information 112, including video data 332 and audio data 334. Optical disc 102 may, for example, have stored thereon instructional information 114 including computer implementable instructions 348.

Memory 304 may, for example, include primary memory 304A such as, e.g., a random access memory (RAM) or the like. Memory 304 may also include secondary memory 304B, which may include local memory 204 (e.g., a hard disk drive, solid state drive, or other like non-volatile storage devices and/or media). Thus, as illustrated, secondary memory 304B may include data assets 206 and/or manifests 208.

By way of example but not limitation, user interface 306 may include and/or otherwise be operatively coupled to a user input device 308 (e.g., a keypad, a touch screen, a joystick, a mouse, remote control, a camera, a microphone, etc.). In certain exemplary implementations, user interface 306 may include a wireless communication interface adapted to receive wireless signals (not shown) from a remotely controlled user input device 308. Such wireless signals may, for example, include infrared, radio frequency, or other like electromagnetic signals.

While not shown in FIG. 3, optical disc reading mechanism 330 may, for example, include a receptacle adapted for receiving optical disc 102, an optical disc rotation mechanism adapted for rotating optical disc 102, a optical reading mechanism (e.g., a laser read head, etc.) adapted for reading information stored on optical disc 102 in the form of data, and supporting control circuitry adapted for controlling the operation of optical disc reading mechanism 330 and providing the information read from optical disc 102 to at least bus 350.

In certain exemplary implementations, optical disc reading mechanism 330 may be adapted to read one or more of a compact disc (CD), a digital versatile disc (DVD), a Blu-Ray disc, and/or the like. In certain exemplary implementations, optical disc reading mechanism 330 may be adapted to hold and/or otherwise manipulate multiple optical discs. In certain exemplary implementations, optical disc 102 may be adapted as a read only disc, a read/writable disc, a read/rewritable disc, etc. Thus, in certain implementations, optical disc reading mechanism 330 may be adapted to only read from optical disc 102, while in other implementations optical disc reading mechanism 330 may be adapted to read and write to optical disc 102. Such mechanisms and techniques are well known.

Processing unit 302 may, for example, be implemented using hardware, firmware, software, and/or any combination thereof. Processing unit 302 may, for example, be implemented using digital and/or analog circuitry. Processing unit 302 may, for example, be implemented using a central processing unit, a microprocessor, a microcontroller, an application specific integrated circuit (ASIC), a graphical processing unit (GPU), and/or other like circuits.

Processing unit 302 may include any form of circuitry that may be adapted based, at least in part, on at least a portion of instructional information 114. Processing unit 302 may, for example, be adapted to perform and/or to otherwise support at least a portion of exemplary method 400 (FIG. 4). Processing unit 302 may, for example, be adapted to implement VFM 210.

Network interface 326 may, for example, include any circuitry adapted to provide for communication with at least network 116. Network interface 326 may, for example, be adapted to provide such communication over one or more wired and/or wireless communication links. Network 116 may, for example, include one or more communication resources adapted to provide communication between network interface 326 and at least one computing device, such as, e.g., network resource device 120.

By way of example but not limitation, network 116 may include a wired and/or wireless local area network (LAN and/or WLAN), a wired and/or wireless telephone network, the Internet, and/or the like. By way of example but not limitation, in certain implementations, network interface 226 may include a wired and/or wireless modem, an Ethernet interface, a telephone interface, an antenna, a transmitter, a receiver, a transceiver, and/or the like.

Display interface 340 may, for example, be adapted to at least provide content signals to a video monitor device 108 to implement a display associated with VFM 210. Some exemplary displays are illustrated in FIGS. 5-10, for example.

Figure 5:
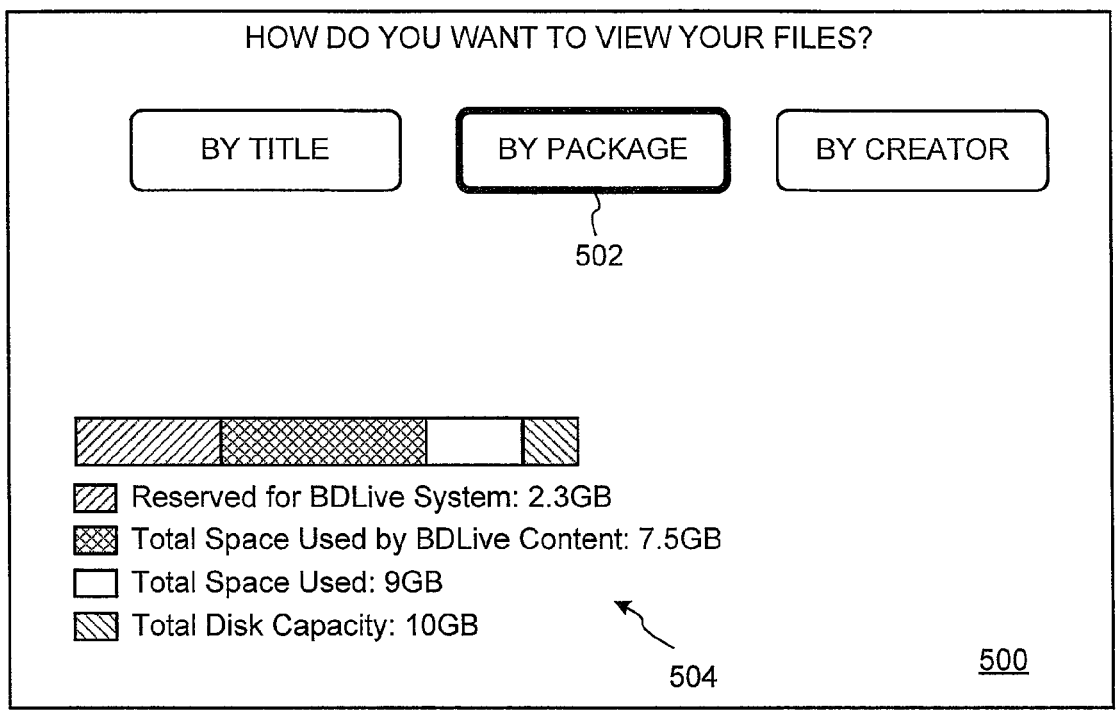
FIG. 5 through FIG. 10 are exemplary user interactive displays associated with a visual file manager adapted for managing data assets stored in local memory of the optical disc player device.

In FIG. 5, display 500 may be adapted to allow the user to select how the data assets may be presented. By way of example but not limitation, data assets may be presented by title, package, or by creator (e.g., source). Here, the "By Package" option 502 has been selected. Also, included in the example, is a graphical bar chart 504 representing a usage status of the local memory.

Figure 6:
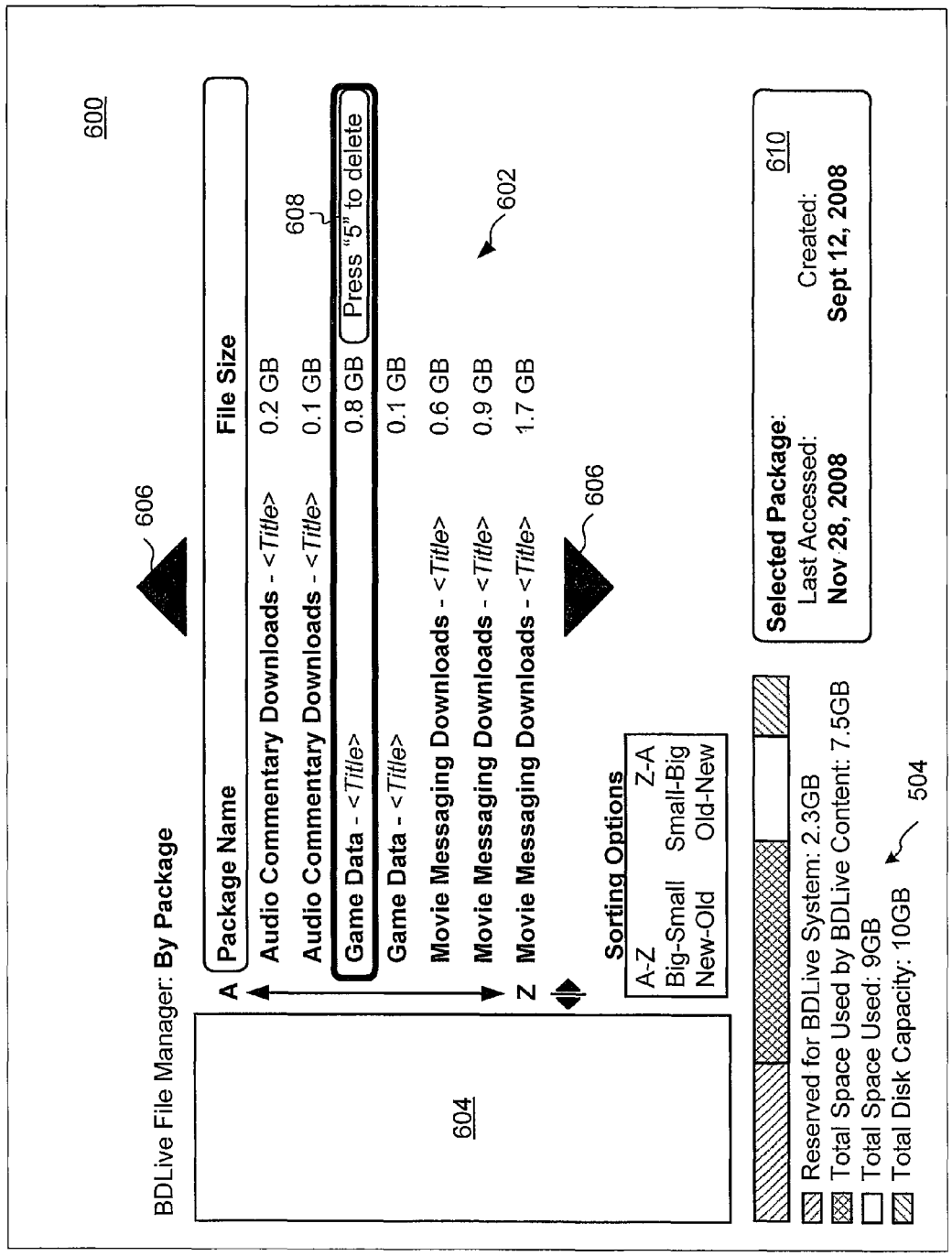

In FIG. 6, "By Package" display 600 may be adapted to allow the user to view and/or select specific packages by name and/or description. Display 600 may include, for example, a list 602 and scroll mechanisms 606. Display 600 may include, for example, related time information 610, a graphical icon or other like area 604, and manipulation selector 608 for a selected package.

Figure 7:
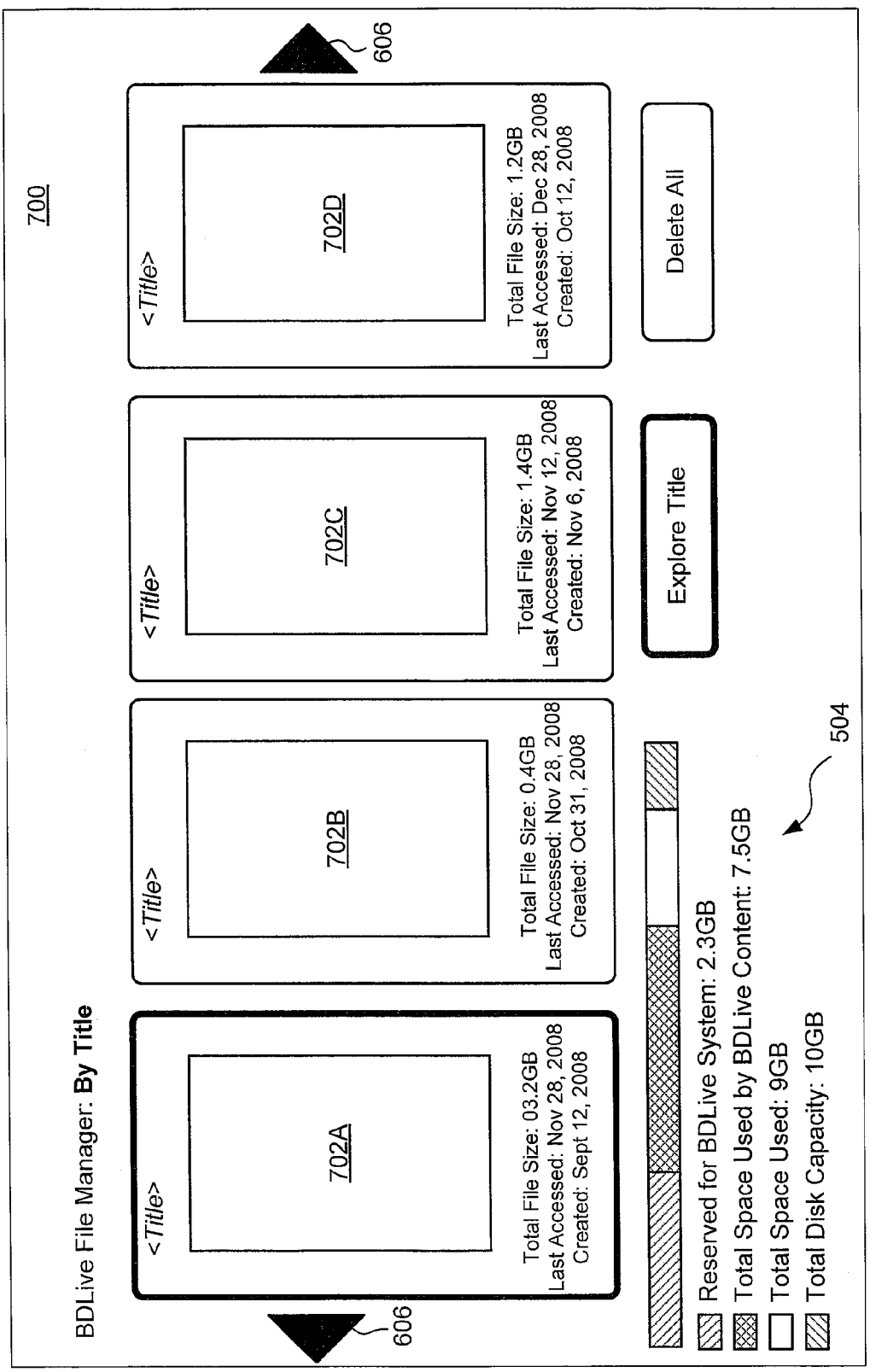

In FIG. 7, "By Title" display 700 may be adapted to allow the user to view and/or select specific packages by title. Display 700 may include, for example, several graphical icons or other like areas (..., 702A-702D, ...) and scroll mechanisms 606. Display 700 may include, for example, related time information and manipulation selector(s) for a selected package.

Figure 8:
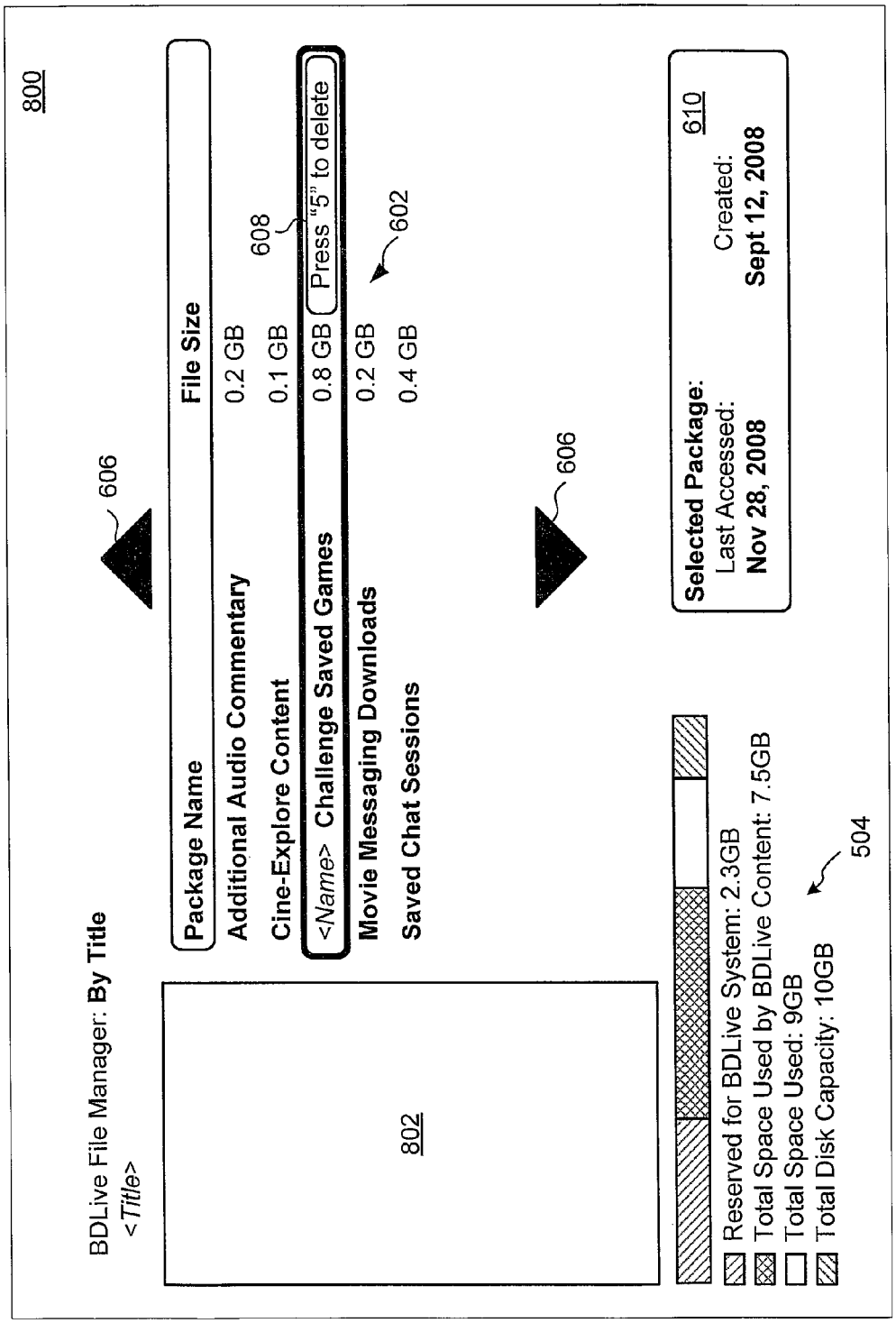

In FIG. 8, "By Title" display 800 may be adapted to allow the user to view and/or select specific data assets by name and/or description. Display 800 may include, for example, a list 602 and scroll mechanisms 606. Display 800 may include, for example, related time information 610, a graphical icon or other like area 802, and manipulation selector 608 for a selected data asset.

Figure 9:
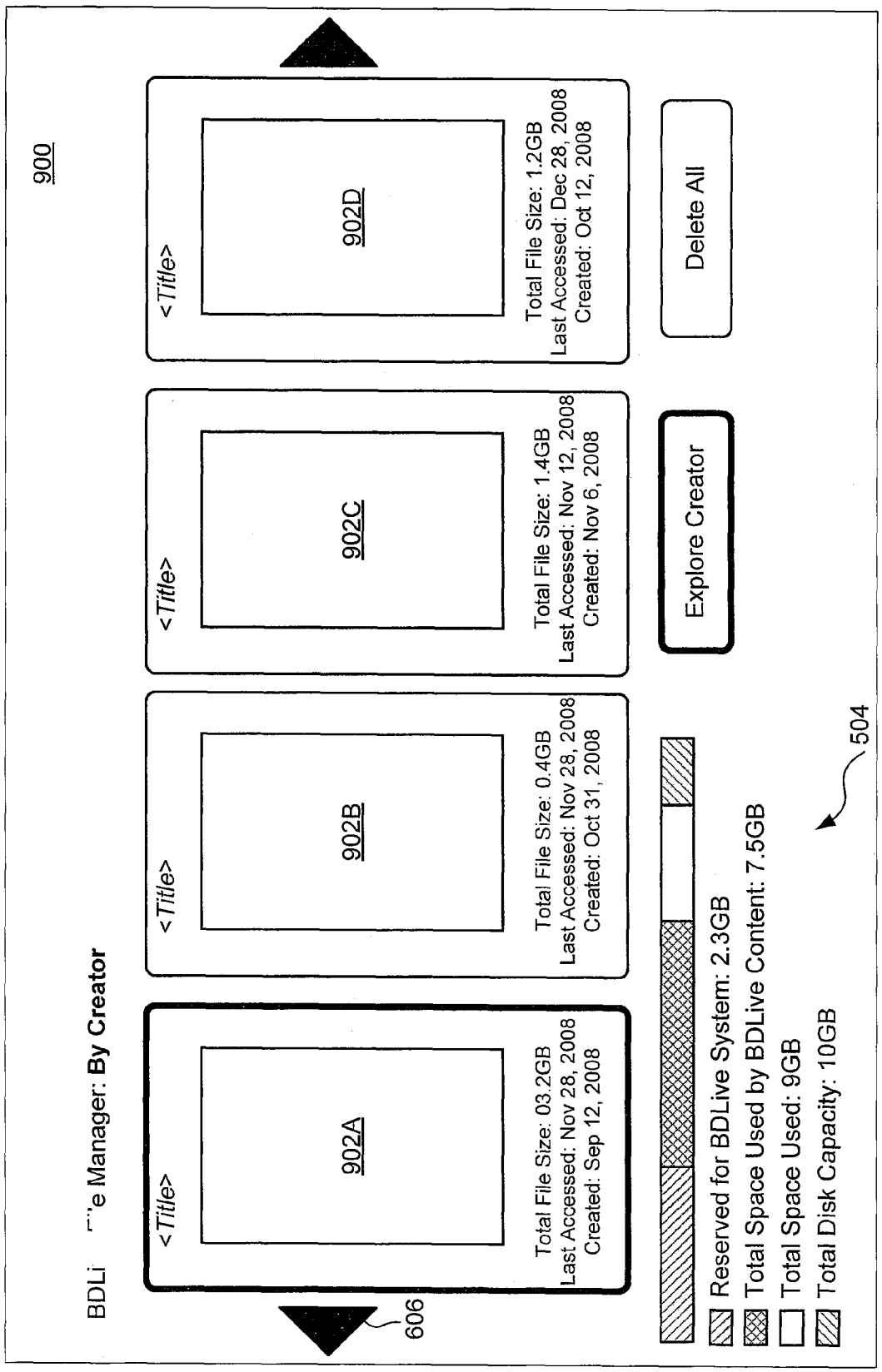

In FIG. 9, "By Creator" display 900 may be adapted to allow the user to view and/or select specific packages by creator. Display 900 may include, for example, several graphical icons or other like areas (..., 902A-902D, ...) and scroll mechanisms 606. Display 700 may include, for example, related time information and manipulation selector(s) for a selected package.

Figure 10:
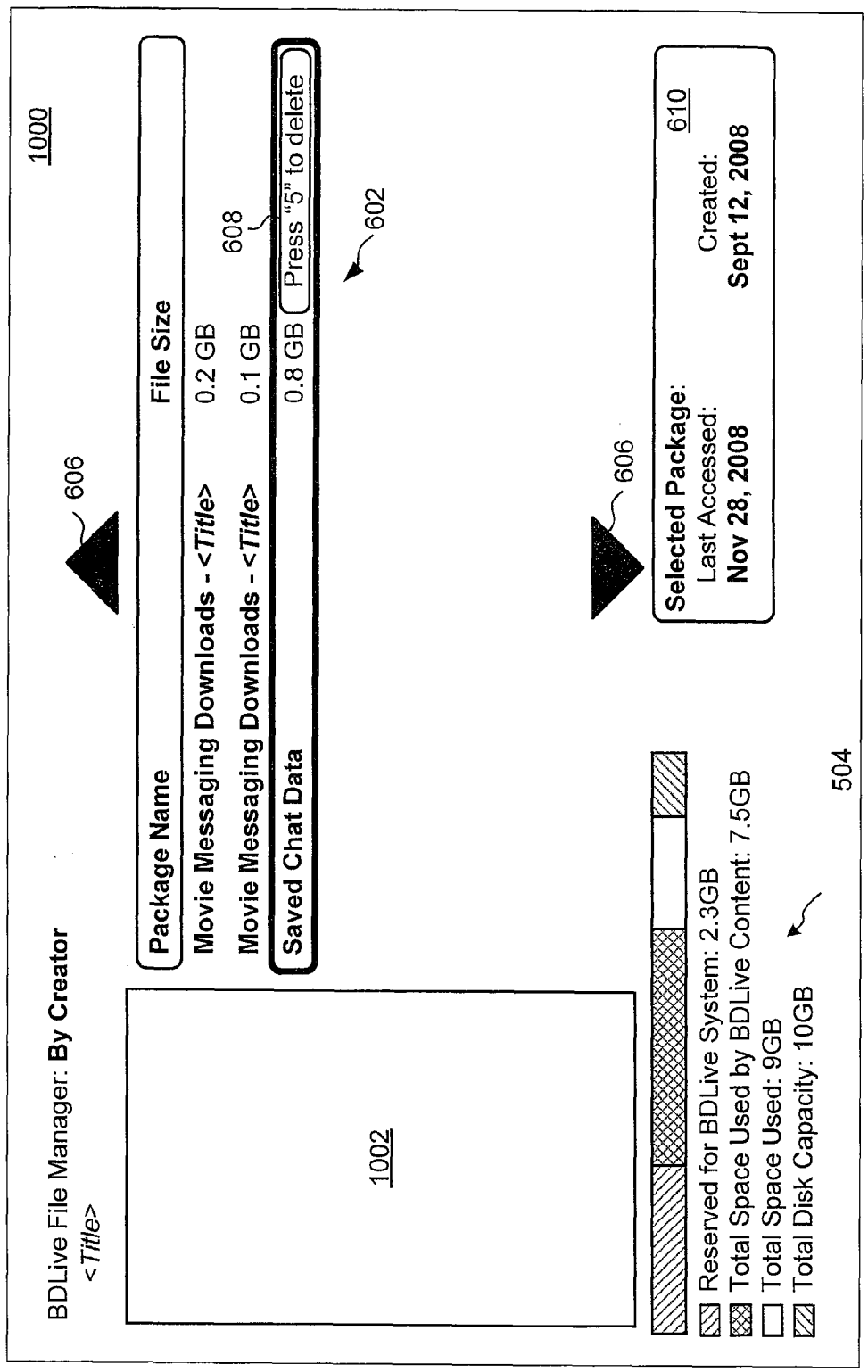

In FIG. 10, "By Creator" display 1000 may be adapted to allow the user to view and/or select specific data assets by name and/or description. Display 1000 may include, for example, a list 602 and scroll mechanisms 606. Display 1000 may include, for example, related time information 610, a graphical icon or other like area 1002 (e.g., creator logo, avatar, image, etc.), and manipulation selector 608 for a selected data asset.

The sections below provide some further exemplary implementations and discussion. With regard to packages, in certain implementations, data on a user's player may be presented as packages rather than individual files. This may remove the user from having to be conscious of folder structures and disk arrangement. Individual data assets placed in local memory may be labeled or 'tagged' by an associated small data file (tag, metadata) identifying one or more packages to which it is logically associated with. Packages may be considered to provide a data presentation method. An individual data asset may, for example, change a logical association with a package, for example, depending on the current presentation type to the user. Depending on the view, a package may also be consumed by a larger package as well.

With regard to manifests, such process may, for example, start at a data asset's creation. In a Profile 2.0 Blu-ray example, a data asset (file) may be created by transferring it from a Blu-ray disc, downloading it from a network resource, and/or creating it through a local application (e.g., via user input). In all cases, the creating application may include a descriptor of the file that 'tags' it with relevant data, including logical associations with one or more possible packages. This data may be added to a persisted manifest that may be adapted to link or otherwise map the actual file in the local memory's file system to a proposed package view. Applications may, for example, be provided to update a manifest. When a data asset is selected for removal its corresponding manifest entry may be removed too.

With regard to tags and tagging, a number of possible tags exist that a data asset may include or otherwise be associated with. For example, a tag may identify a package to which the data asset logically belongs. In certain implementations one or more tags may also include certain attributes, such as, e.g., File Size, Last Accessed, Date Created, and/or other like information.

In certain example implementations, a package may be linked to a specific title (film, disk), a selection of titles (a series of films, multi-disk set), no title, special case files (trailers and other "Pure-Media" may be special cases), the system, etc. The term "Pure Media" may represent a special designation in this exemplary system. "Pure Media" may designate a file containing any type or combination of content (video, sound, etc), that will be accessed from a package or feature, but may not be a part of it. Trailers are a good example, because many different packages and features may desire to play a trailer. They may also include relatively larger files. "Pure Media" files may have their own special method of browsing that may be cross-linked to a file browser, but is not a part of it. For example, a "trailer browser" may be present on certain titles, and that browser will be the preferred method of trailer management.

A manifest entry may exist for each individual package as well, with a list of tags pertaining to those packages. This may be used purely for user presentation in certain implementations. Users may be restricted or otherwise not given an option to manipulate certain assets such as system packages (e.g., assets that extend over/across many titles, the file manager itself, etc), and their file size may added to the general system count in a status (504).

Tags related to a creation point of the file may also be included. The original source of the file, be it on-disk or downloaded may also be noted. Furthermore, in certain example implementations, an original creator may be maintained. In cases where determining a 'safe' file for user presentation may be important, a manifest may be used to determine if a file originated from an approved publisher. A tag may also be adapted for use in a social networking context. Here, for example, "Buddies" or "creators" may be used as criteria to group data assets into packages. Thus, in certain implementations, dynamic packaging may be implemented, for example, to present a user with an option to manage "all content created by <name>".

Support for dynamic application dependencies may be provided. For example, in many set-top platforms, limited memory is a constant concern for application developers. A single application may require or have the ability to reference many packages that may be removed at will by the user or other applications that need storage space. Using such file management techniques, applications may reference one or more manifests to quickly determine what packages are available to it. Furthermore, if required packages are missing, an application may quickly determine this, and prompt the user to either re-install and/or possibly download the needed data assets.

With regard to presentation to the user, when a user indicates a desire to manage certain data assets, a VFM may be initiated. With the VFM a user may access packages through a number of different presentation types, as illustrated in the earlier examples. In certain implementations, package presentation may be adapted to reduce or otherwise control the information that a user may be presented with.

Sorting by title may be implemented to present a user with a list of titles. Here, for example, in certain implementations a user may delete all content relative to a single title, or choose to expand a title and manage packages that may be related to that title. Packages may be sorted alphabetically, or otherwise.

Sorting by creator may be implemented to present a user with a list of "creators" that have provided content that is now resident in the local memory. This may include, for example, a list of content a user may have downloaded. Here too, packages may be sorted alphabetically, or otherwise.

Sorting by package may be implemented to show packages available in the system. Here, there may be a number of available options, including sort alphabetically, by date created, by date accessed, file size, etc.

While certain exemplary techniques have been described and shown herein using various systems and methods, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method for use in an optical disc player device, the method comprising:
   accessing instructional information stored on an optical disc, said instructional information being adapted to establish a visual file manager that is adapted to:
   identify a plurality of persisted data assets stored in memory of the optical disc player device;
   logically assign, according to a logical association, a subset of said plurality of persisted data assets to at least one logical package based upon a persistence restriction;
   tag, according to the persistence restriction, said subset of said plurality of persisted data assets with a descriptor that includes the logical association;
   add data corresponding to the descriptor to a persisted manifest adapted to map the plurality of persisted data assets in the memory to a package view, the package view providing a presentation method for a user; and
   selectively manage said at least one logical package based, at least in part, on user input, wherein said user input is adapted to initiate manipulation of at least one of said plurality of persisted data assets.

2. The method as recited in claim 1, wherein at least a first portion of said plurality of persisted data assets is associated with a first non-persisted data source and at least a second portion of said plurality of persisted data assets is associated with at least a second non-persisted data source.

3. The method as recited in claim 2, wherein said first non-persisted data source comprises a first optical disc associated with first content information and said second non-persisted data source comprises a second optical disc associated with second content information.

4. The method as recited in claim 3, wherein said first and second content information are each associated with at least one common content source entity.

5. The method as recited in claim 2, wherein at least said first non-persisted data source comprises at least one network resource device.

6. The method as recited in claim 1, wherein said visual file manager is adapted to associate each of said plurality of persisted data assets in said subset with at least one common data tag.

7. The method as recited in claim 6, wherein said at least one common data tag is provided in a metadata portion of each of said plurality of persisted data assets in said subset.

8. The method as recited in claim 1, wherein said visual file manager is adapted to identify each of said plurality of persisted data assets in said subset in at least one manifest associated with said package.

9. The method as recited in claim 1, wherein said visual file manager is adapted to at least initiate presentation of at least one data asset identifier associated with at least one of said plurality of persisted data assets in said subset through a user interactive display.

10. The method as recited in claim 9, wherein said visual file manager is adapted to not initiate presentation of at least a data asset identifier associated with at least a second one of said plurality of persisted data assets in said subset.

11. The method as recited in claim 1, wherein said visual file manager is adapted to initiate presentation of at least one status parameter associated with said memory of the optical disc player device through a user interactive display.

12. The method as recited in claim 1, wherein said manipulation comprises removal of said at least one of said plurality of persisted data assets from said memory.

13. The method as recited in claim 1, wherein said visual file manager is adapted to prevent manipulation of at least a second one of said plurality of persisted data assets logically associated with said at least one logical package.

14. The method as recited in claim 1, wherein at least one of said plurality of persisted data assets is logically associated with a plurality of logical packages.

15. The method as recited in claim 14, wherein at least one of said plurality of logical packages is logically associated with at least one other of said plurality of logical packages.

16. The method as recited in claim 1, wherein said visual file manager is adapted to at least initiate presentation of at least one data asset identifier associated with at least one of said plurality of persisted data assets in said subset through a user interactive display based on at least one of a title, a package, and/or a source.

17. The method as recited in claim 1, wherein said memory of the optical disc player device comprises at least one of a hard disk drive, and/or a non-volatile solid state memory.

18. The method as recited in claim 1, wherein said optical disc comprises a Blu-ray disc.

19. An apparatus comprising:
an optical disc;
an optical disc player device adapted to access instructional information stored on said optical disc, and based, at least in part, on said instructional information establish a visual file manager that is adapted to:

logically assign, according to a logical association, a subset of said plurality of persisted data assets to at least one logical package based upon a persistence restriction;
tag, according to the persistence restriction, said subset of said plurality of persisted data assets with a descriptor that includes the logical association;
add data corresponding to the descriptor to a persisted manifest adapted to map the plurality of persisted data assets in the memory to a package view, the package view providing a presentation method for a user; and
selectively manage said at least one logical package based, at least in part, on user input, wherein said user input is adapted to initiate manipulation of at least one of said plurality of persisted data assets.

20. The apparatus as recited in claim 19, wherein at least a first portion of said plurality of persisted data assets is associated with a first non-persisted data source and at least a second portion of said plurality of persisted data assets is associated with at least a second non-persisted data source.

21. The apparatus as recited in claim 20, wherein said first non-persisted data source comprises a first optical disc associated with first content information and said second non-persisted data source comprises a second optical disc associated with second content information.

22. The apparatus as recited in claim 21, wherein said first and second content information are each associated with at least one common content source entity.

23. The apparatus as recited in claim 20, wherein at least said first non-persisted data source comprises at least one network resource device.

24. The apparatus as recited in claim 19, wherein said visual file manager is adapted to associate each of said plurality of persisted data assets in said subset with at least one common data tag.

25. The apparatus as recited in claim 24, wherein said at least one common data tag is provided in a metadata portion of each of said plurality of persisted data assets in said subset.

26. The apparatus as recited in claim 19, wherein said visual file manager is adapted to identify each of said plurality of persisted data assets in said subset in at least one manifest associated with said package.

27. The apparatus as recited in claim 19, wherein said visual file manager is adapted to at least initiate presentation of at least one data asset identifier associated with at least one of said plurality of persisted data assets in said subset through a user interactive display.

28. The apparatus as recited in claim 27, wherein said visual file manager is adapted to not initiate presentation of at least a data asset identifier associated with at least a second one of said plurality of persisted data assets in said subset.

29. The apparatus as recited in claim 19, wherein said visual file manager is adapted to initiate presentation of at least one status parameter associated with said memory of the optical disc player device through a user interactive display.

30. The apparatus as recited in claim 19, wherein said manipulation comprises removal of said at least one of said plurality of persisted data assets from said memory.

31. The apparatus as recited in claim 19, wherein said visual file manager is adapted to prevent manipulation of at least a second one of said plurality of persisted data assets logically associated with said at least one logical package.

32. The apparatus as recited in claim 19, wherein at least one of said plurality of persisted data assets is logically associated with a plurality of logical packages.

33. The apparatus as recited in claim 32, wherein at least one of said plurality of logical packages is logically associated with at least one other of said plurality of logical packages.

34. The apparatus as recited in claim 19, wherein said visual file manager is adapted to at least initiate presentation of at least one data asset identifier associated with at least one of said plurality of persisted data assets in said subset through a user interactive display based on at least one of a title, a package, and/or a source.

35. The apparatus as recited in claim 19, wherein said memory of the optical disc player device comprises at least one of a hard disk drive, and/or a non-volatile solid state memory.

36. The apparatus as recited in claim 19, wherein said optical disc comprises a Blu-ray disc.

37. A computer readable storage device comprising computer implementable instructions stored thereon, which if implemented by one or more processing units adapt said one or more processing units to establish a visual file manager that is adapted to:
- identify a plurality of persisted data assets stored in memory of an optical disc player device;
- logically assign, according to a logical association, a subset of said plurality of persisted data assets to at least one logical package based upon a persistence restriction;
- tag, according to the persistence restriction, said subset of said plurality of persisted data assets with a descriptor that includes the logical association;
- add data corresponding to the descriptor to a persisted manifest adapted to map the plurality of persisted data assets in the memory to a package view, the package view providing a presentation method for a user; and
- selectively manage said at least one logical package based, at least in part, on user input, wherein said user input is adapted to initiate manipulation of at least one of said plurality of persisted data assets.

38. The computer readable storage device as recited in claim 37, wherein at least a first portion of said plurality of persisted data assets is associated with a first non-persisted data source and at least a second portion of said plurality of persisted data assets is associated with at least a second non-persisted data source.

39. The computer readable storage device as recited in claim 38, wherein said first non-persisted data source comprises a first optical disc associated with first content information and said second non-persisted data source comprises a second optical disc associated with second content information.

40. The computer readable storage device as recited in claim 39, wherein said first and second content information are each associated with at least one common content source entity.

41. The computer readable storage device as recited in claim 38, wherein at least said first non-persisted data source comprises at least one network resource device.

42. The computer readable storage device as recited in claim 37, wherein said visual file manager is adapted to associate each of said plurality of persisted data assets in said subset with at least one common data tag.

43. The computer readable storage device as recited in claim 42, wherein said at least one common data tag is provided in a metadata portion of each of said plurality of persisted data assets in said subset.

44. The computer readable storage device as recited in claim 37, wherein said visual file manager is adapted to identify each of said plurality of persisted data assets in said subset in at least one manifest associated with said package.

45. The computer readable storage device as recited in claim 37, wherein said visual file manager is adapted to at least initiate presentation of at least one data asset identifier associated with at least one of said plurality of persisted data assets in said subset through a user interactive display.

46. The computer readable storage device as recited in claim 45, wherein said visual file manager is adapted to not initiate presentation of at least a data asset identifier associated with at least a second one of said plurality of persisted data assets in said subset.

47. The computer readable storage device as recited in claim 37, wherein said visual file manager is adapted to initiate presentation of at least one status parameter associated with said memory of the optical disc player device through a user interactive display.

48. The computer readable storage device as recited in claim 37, wherein said manipulation comprises removal of said at least one of said plurality of persisted data assets from said memory.

49. The computer readable storage device as recited in claim 37, wherein said visual file manager is adapted to prevent manipulation of at least a second one of said plurality of persisted data assets logically associated with said at least one logical package.

50. The computer readable storage device as recited in claim 37, wherein at least one of said plurality of persisted data assets is logically associated with a plurality of logical packages.

51. The computer readable storage device as recited in claim 50, wherein at least one of said plurality of logical packages is logically associated with at least one other of said plurality of logical packages.

52. The computer readable storage device as recited in claim 37, wherein said visual file manager is adapted to at least initiate presentation of at least one data asset identifier associated with at least one of said plurality of persisted data assets in said subset through a user interactive display based on at least one of a title, a package, and/or a source.

53. The computer readable storage device as recited in claim 37, wherein said memory of the optical disc player device comprises at least one of a hard disk drive, and/or a non-volatile solid state memory.

54. The computer readable storage device as recited in claim 37, wherein said computer readable medium comprises a Blu-ray disc.

* * * * *